United States Patent
Gross et al.

(10) Patent No.: US 6,733,701 B2
(45) Date of Patent: May 11, 2004

(54) METHOD FOR SIMPLIFYING THE CASTING OF OPHTHALMIC LENSES

(75) Inventors: Thomas M. Gross, Palm Harbor, FL (US); David E. Boyd, Palm Harbor, FL (US)

(73) Assignee: DTQ Properties, LLC, Palm Harbor, FL (US)

( * ) Notice: Subject to any disclaimer, the term of this patent is extended or adjusted under 35 U.S.C. 154(b) by 237 days.

(21) Appl. No.: 09/682,565

(22) Filed: Sep. 20, 2001

(65) Prior Publication Data

US 2003/0052423 A1 Mar. 20, 2003

(51) Int. Cl.[7] ............................................... B29D 11/00

(52) U.S. Cl. ........................................ 264/2.5; 425/808

(58) Field of Search .................... 264/1.1, 2.5; 425/808

(56) References Cited

U.S. PATENT DOCUMENTS 3,528,135 A * 9/1970 Reiterman ................ 425/808

* cited by examiner

*Primary Examiner*—Mathieu D. Vargot
(74) *Attorney, Agent, or Firm*—Smith and Hopen, P.A.; Ronald E. Smith

(57) ABSTRACT

A method for casting an ophthalmic lens having a toric surface includes the step of providing a casting cell that includes a conventional front mold, a novel gasket, and a novel toric back mold. An annular carrier ring is integrally formed with or attached to the toric back mold. The gasket has a first annular flat step against which the front mold squarely abuts and a second annular flat step against which the annular carrier ring squarely abuts. The gasket includes no toric annular seat against which the front surface of a toric back mold abuts. This eliminates the need for a lens maker to maintain a large inventory of toric back molds and gaskets. The square seating enhances the sealing capability of the mold, reduces leaks, and produces lenses having fewer bubbles and flash on the edge of the lens.

4 Claims, 3 Drawing Sheets

METHOD FOR SIMPLIFYING THE CASTING OF OPHTHALMIC LENSES

BACKGROUND OF INVENTION

1. Field of the Invention

This invention relates, generally, to methods for casting ophthalmic lenses. More particularly, it relates to a method that reduces the number of gaskets that a lens maker must maintain in inventory.

2. Description of the Prior Art

The optical characteristics of an ophthalmic lens can be varied by the curvature of its two surfaces, the thickness at its center and edges, and its diameter. The two surfaces of a lens can use several different geometric configurations. One example is a toric surface that resembles the lateral surface of a torus and which has a barrel shape. A toric surface is similar to a cylindrical surface, but the longitudinal axis curves instead of being straight as in the case of a cylindrical surface. The perpendicular axis or meridian on the toric surface has a radius of curvature smaller that the radius of the axis. As with a cylindrical surface, a toric surface can be convex by having the shape of the exterior surface of a torus or, alternatively, may be concave by having the shape of the inner surface of a torus. In addition to the toric and cylindrical geometric shapes, lenses may also be spherical, piano, elliptical, or progressive.

The desired optical characteristic of a lens may include a combination of the different geometric shapes. For example, a lens may have a spherical front surface and a toric back surface. An eyeglass lens used to correct astigmatism is a toric lens. It is curved in such a way as to have a different focal length along each axis. A common lens configuration includes a convex spherical front surface and a concave toric back surface.

Plastic ophthalmic lenses are typically fabricated by casting and curing a transparent plastic material within a casting cell. The casting cell includes a front mold and a back mold that fit together within a cylindrical gasket. Each mold has a polished inner surface with desired optical characteristics that are transferred, respectively, to either the front or rear of a plastic lens during the casting process. The cylindrical gasket provides a seal for the molds and forms the edge of the lens. The casting cell is filled with plastic and cured using heat or ultraviolet radiation.

The optical characteristics that each mold provides to a lens vary significantly. Therefore, one mold cannot be used to account for every possible variation that may be required to meet corrective ophthalmic specifications. Therefore, a lens is produced that has a concave, unfinished side that is surfaced after the curing process is completed. Thus, instead of forming the lens to be mounted into glasses with a few finishing actions, the semi-finished lens has only a single finished surface formed by a mold and the other surface is mechanically finished after the lens has been cured. The semi-finished lenses, accordingly, are made in stages, in which one surface is finished by a mold and the other surface is machine finished after curing. The surface of the lens formed by a mold is usually the front spherical surface, with or without add power.

Attempts have been made at eliminating the labor involved with transforming a semi-finished lens to a finished lens by creating a lens that is formed with both surfaces finished. Each different optical characteristic required for a particular corrective lens necessitates several combinations of a front mold, back mold, and gasket. A lens that is cast in finished form represents significant savings in the cost of manufacturing a lens with the reduction of the labor involved in producing a finished lens. However, producing finished lenses through casting requires a voluminous number of molds and gaskets to produce the range of different corrective lenses and is therefore impractical.

For example, the prior art gasket that receives the toric back mold must have a toric seat that is a complement to that particular toric back mold. Accordingly, a large inventory of toric molds and corresponding toric gaskets must be maintained to enable the making of the vast range of corrective toric lenses.

Continuing efforts are being made to improve the casting of plastic lenses to produce finished lenses. By way of example, U.S. Pat. No. 4,522,768 to Roscrow et al. discloses an assembly that allows adjustment of a first mold so that a multiplicity of desired optical characteristics can be made using a limited number of casting dies and gasket members. However, more than one gasket is required to achieve all desired optical characteristics. U.S. Pat. No. 5,160,749 to Fogarty discloses a leak resistant seal for a mold assembly for making a lens. Fogarty does not provide for producing toric lenses, but rather only a lens blank that must be ground and polished to the desired optical characteristics. U.S. Pat. No. 6,103,148 to Su et al. discloses a gasket that can accommodate a plurality of molds but does not teach a method that incorporates an improved and simplified sealing mechanism for the gasket.

There is a need, therefore, for a method that simplifies the making of a toric lens. More particularly, there is a need for a method that would reduce the number of toric gaskets that would need to be maintained in inventory. Moreover, there is a need for a method that facilitates sealing of the toric lens mold as well.

However, in view of the prior art considered as a whole at the time the present invention was made, it was not obvious to those of ordinary skill in the pertinent art how the identified needs could be fulfilled.

SUMMARY OF INVENTION

The longstanding but heretofore unfulfilled need for an improved method of casting toric lenses is now met. The new, useful, and nonobvious method includes the steps of providing a casting cell that includes a front mold, a toric back mold, and a gasket. An annular carrier ring is formed integrally with the toric back mold, and a radially-inwardly extending annular wall is formed in the gasket. A flat first step is formed where a front edge of the annular wall meets the gasket at a right angle and a flat second step is formed where a rear edge of the annular wall meets the gasket at a right angle.

In a first embodiment, the annular carrier ring is formed on the rear or lower end of the toric back mold and a right angle is formed where the peripheral edge of the toric back mold and the annular carrier ring meet.

The first flat step is adapted to squarely abut and support a peripheral edge of the front mold when the casting cell is assembled.

The second flat step is adapted to squarely abut and support the annular carrier ring of the toric back mold when the casting cell is assembled.

When the casting cell is assembled, the peripheral edge of the front mold is positioned in squarely abutting relation to the first flat step and the annular carrier ring of the toric back mold is positioned in squarely abutting relation to the second flat step. A cavity defined by a back surface of the front mold and a front surface of the toric back mold is filled with a reactive resin and the resin is cured.

In a second embodiment, the annular carrier ring and the toric back mold are integrally formed with one another and the annular carrier ring is coextensive with a peripheral edge of the toric back mold. A square, annular step is formed in the peripheral edge of the toric back mold. A radially-inwardly extending annular wall is formed in the gasket so that a first flat step is formed where a front edge of the annular wall meets the gasket at a right angle and so that a second flat step is formed where a rear edge of the annular wall meets the gasket at a right angle. The peripheral edge of the front mold is positioned in squarely abutting relation to the first flat step and the square, annular step formed in said peripheral edge of the toric back mold is positioned in squarely abutting relation to the second flat step.

As in the first embodiment, a cavity defined by a back surface of the front mold and a front surface of the toric back mold is filled with a reactive resin and the resin is cured.

In a third embodiment, the annular carrier ring is formed integrally with a peripheral edge of the toric back mold and may have any predetermined geometrical configuration. An annular recess having a matching geometric configuration is formed in the gasket so that the toric back mold and gasket are snap-fit together. In this embodiment, the radially-inwardly extending annular wall of the first embodiment provides the first flat step on the front edge of the annular wall and the front mold is fitted thereto as in the first embodiment. The second flat step of the first embodiment is eliminated.

A primary object of the invention is to provide an improved method of casting toric lenses.

Another very important object is to provide a method that reduces the number of toric gaskets that must be maintained in inventory by a lens maker.

Still another important object is to provide a method that produces toric lenses having a higher quality that conventionally cast toric lenses.

These and other important objects, advantages, and features of the invention will become clear as this description proceeds.

The invention accordingly comprises the features of construction, combination of elements, and arrangement of parts that will be exemplified in the description set forth hereinafter and the scope of the invention will be indicated in the claims.

BRIEF DESCRIPTION OF DRAWINGS

For a fuller understanding of the nature and objects of the invention, reference should be made to the following detailed description, taken in connection with the accompanying drawings, in which.

DETAILED DESCRIPTION

Figure 1:
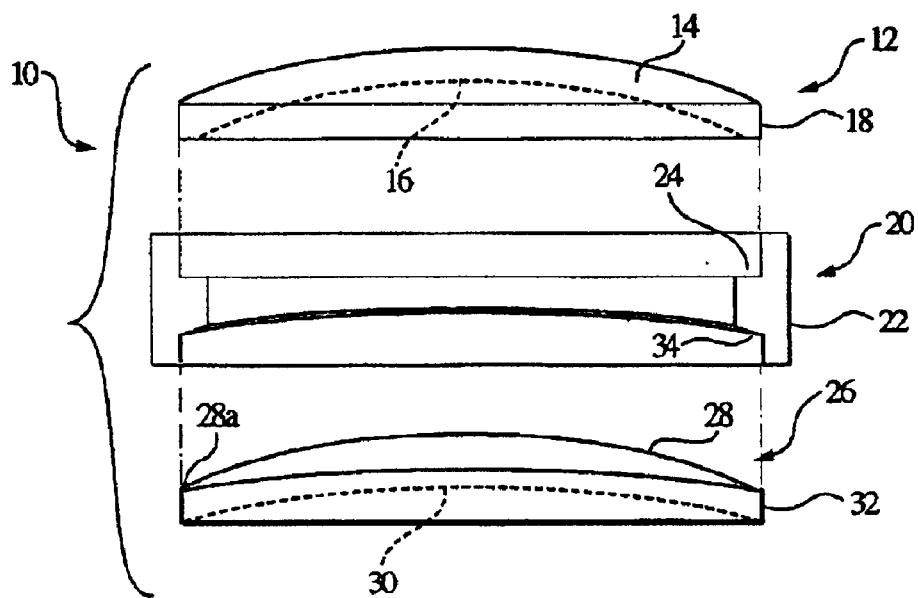
FIG. 1 is an exploded, side elevational view of a prior art casting cell.

Referring now to FIG. 1, it will there be seen that the reference numeral 10 denotes a prior art casting cell as a whole.

Front mold 12 includes a convex spherical front surface 14, a concave spherical back surface 16, and a peripheral edge 18.

Gasket 20 includes a radially-inwardly extending annular wall 22 having a first annular step 24 formed on a front side thereof. Step 24 supports front mold 12 at its peripheral edge 18 when casting cell 10 is in its assembled configuration. Step 24 is flat and provides a sealing surface when casting cell 10 is filled with a reactive resin. There are no sealing problems at the interface of step 24 and peripheral edge 18 of front mold 12 due to the flat configuration of said step.

Toric back mold 26 has a toric front surface 28, a concave spherical back surface 30, and a peripheral edge 32. The periphery 28a of toric front surface 28 seats against second annular step 34 formed in annular wall 22 of gasket 20 when casting cell 12 is assembled. Accordingly, step 34 is toric in configuration.

Since the toric configuration of step 34 of gasket 20 must match the toric front surface 28 of toric back mold 26 if a good seal is to be established between them, a large number of such gaskets and back molds must be maintained in inventory to enable the manufacturing of a normal range of plus and minus toric lenses.

Figure 2:
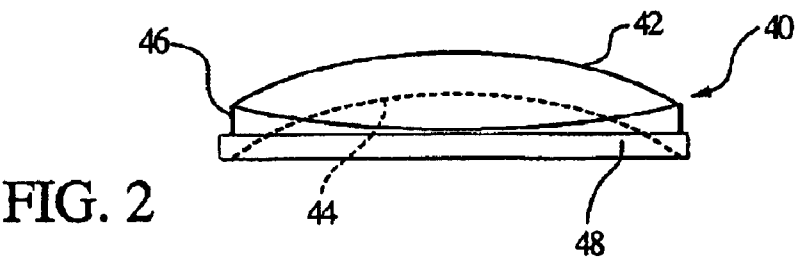
FIG. 2 is a side elevational view of a first embodiment of the novel back mold.

FIG. 2 depicts a novel toric back mold 40; it includes a toric front surface 42, a concave spherical back surface 44, a peripheral edge 46 and an annular carrier ring 48. Annular carrier ring 48 is formed integrally with toric back mold 40 at a rear or outermost end thereof. Accordingly, it forms a right angle with peripheral edge 46 of toric back mold 40.

Figure 3:
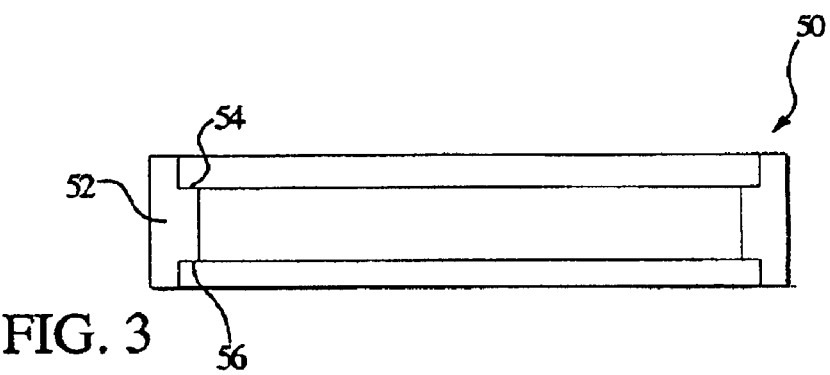
FIG. 3 is a side elevational view of a first embodiment of the novel gasket.

FIG. 3 depicts a novel gasket 50 that, when used in conjunction with toric back mold 40, eliminates the sealing problems associated with the ophthalmic lens making method of the prior art and further eliminate the need to maintain a large inventory of toric back molds and gaskets. Significantly, this invention eliminates the problematic mating of the front surface of a toric back mold with a toric edge of a casting cell gasket. It replaces such toric surface-to-toric surface contact with a more mechanically reliable flat step-to-flat annular carrier ring contact.

As indicated in FIG. 3, novel gasket 50 includes radially-inwardly extending annular wall 52 having a first annular flat step 54 formed on a front or upper side thereof and a second annular flat step 56 formed on a rearward or lower side thereof. First step 54 squarely abuts and supports the peripheral edge of a prior art front mold 12 and second step 56 squarely abuts and supports annular carrier ring 48 of novel toric back mold 40. Second flat step 56 abuts annular carrier ring 48 in the same way that first flat step 54 abuts perimeter 18 of a conventional front mold 12. Accordingly, toric step 34 of prior art gasket 20 is eliminated, together with the concomitant sealing problems associated therewith. Just as importantly, any number of toric back molds 40 having a wide range of plus and minus curvatures may be formed with a generic, one-size-fits-all annular carrier ring 48. The same comment applies to gasket 50; since second annular step 56 is flat, it supports any annular carrier ring 48 without restriction. In this way, there is no need to maintain an inventory where each toric back mold requires a matching gasket.

Figure 4:
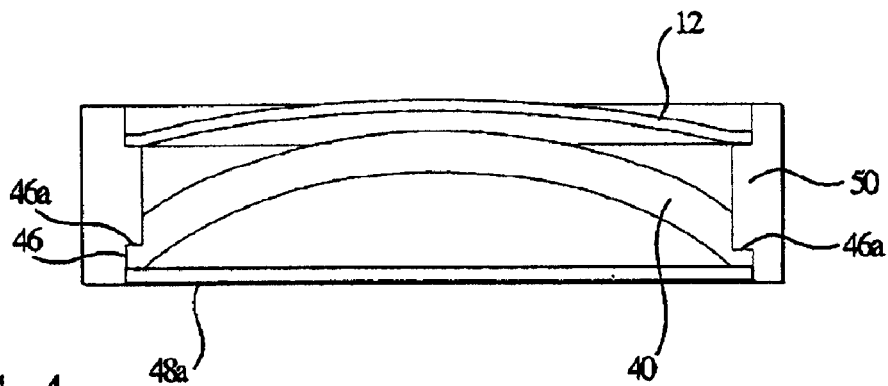
FIG. 4 is a side elevational view of the novel casting cell depicting a second embodiment of the invention.

FIG. 4 illustrates the elements of the casting cell in assembled form including front mold 12, novel back mold 40, and novel gasket 50. However, it differs from the first-described embodiment to the extent that carrier ring 48a is coextensive with peripheral edge 46 of the toric back mold 40. An annular step 46a is formed in the periphery of said mold 40, however, so that carrier ring 48a and peripheral edge 46 perform the same function as carrier ring 48 of the first-described embodiment.

Figure 5:
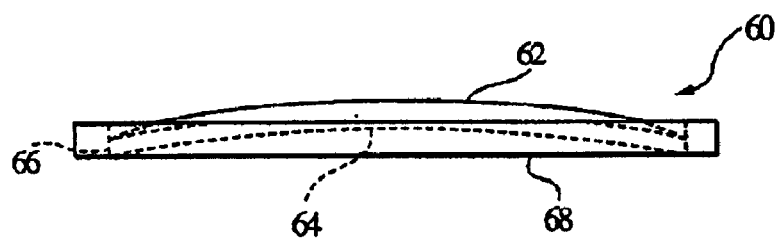
FIG. 5 is a side elevational view of a third embodiment of the novel back mold.
Figure 6:
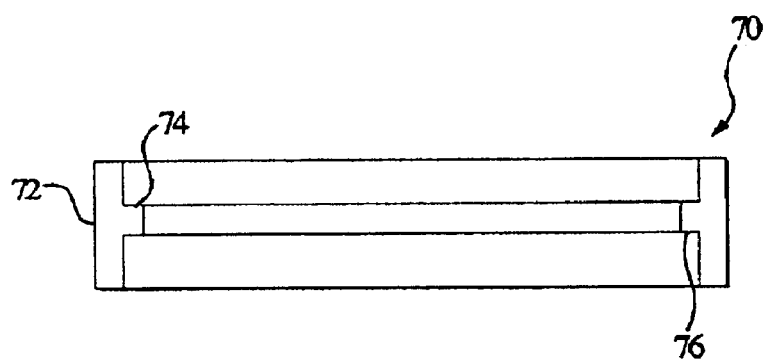
FIG. 6 is a side elevational view of the third embodiment of the novel gasket.

FIG. 5 depicts a third embodiment of a novel toric back mold 60 and FIG. 6 depicts a novel gasket 70 that, when used in conjunction with toric back mold 60, eliminates the sealing problems associated with the ophthalmic lens making method of the prior art and further eliminates the need to maintain a large inventory of toric back molds and gaskets.

As indicated in FIG. 6, novel gasket 70 includes annular wall 72 having a first annular flat step 74 formed on a forward side thereof and a second annular flat step 76 formed on a rearward side thereof. Novel toric back mold 60 includes a toric front surface 62, a concave spherical back surface 64, a peripheral edge 66 and an annular carrier ring 68 that is formed integrally with peripheral edge 66.

Figure 7:
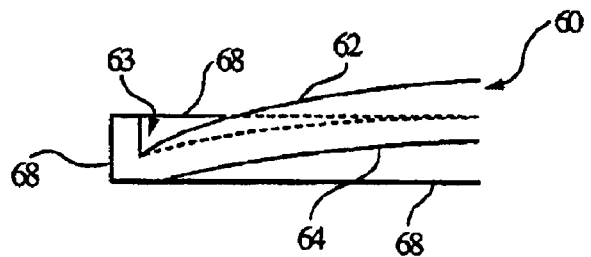
FIG. 7 is a detailed view of the third embodiment of the novel back mold.
Figure 8:
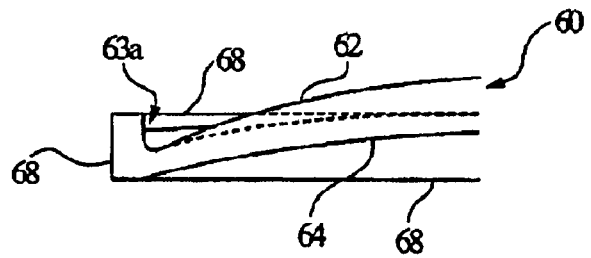
FIG. 8 is a detailed view of a variation of the third embodiment.

FIG. 7 provides an enlarged, partial view of novel toric back mold 60, where carrier ring 68 meets toric front surface 62 at an acute angle 63 and FIG. 8 provides a similar view where carrier ring 68 meets toric front surface 62 at a blended or more rounded angle 63a.

The FIG. 8 structure is preferred because it makes the lens easier to remove from the toric mold. It also produces a smooth, rounded, aesthetically pleasing edge instead of the sharp corner produced by the structure of FIG. 7. Peripheral edge 66 has no physical or concrete boundary as does peripheral edge 32 of prior art toric back mold 32 (FIG. 1); it is pointed out just to emphasize how it is blended with annular carrier ring 68.

Figure 9:
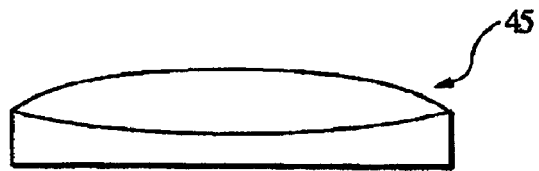
FIG. 9A depicts an unmachined glass mold in side elevation.
FIG. 9B depicts the glass mold of FIG. 9A, with the cross-hatched area indicating the part of said glass mold removed by machining.
Figure 9:
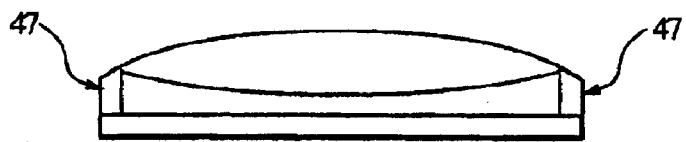

The annular carrier ring of the first two embodiments may be of metallic construction; in that case, it is adhered to the glass mold by a suitable adhesive. Where both the mold and the annular carrier ring are formed of glass, a glass mold 45, depicted in FIG. 9A, may be machined to remove the material denoted 47 in FIG. 9B. The resulting mold is depicted in FIG. 2.

Figure 10:
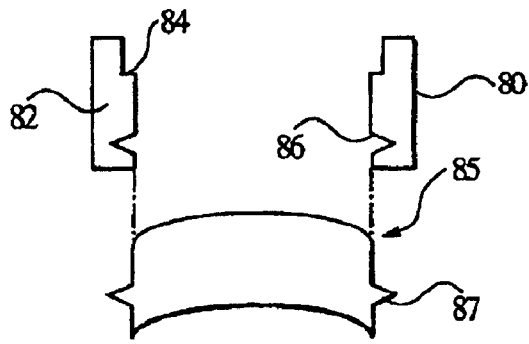
FIG. 10 is a side elevational view of a fourth embodiment of the novel gasket and back mold.

Turning now to the fourth embodiment, FIG. 10 depicts a novel toric back mold 85 with a "V"-shaped projection 87 adapted to engage a complementally formed "V"-shaped recess 86 of gasket 80.

Figure 11:
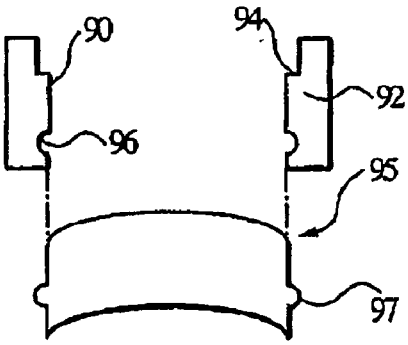
FIG. 11 is a side elevational view of a variation of the fourth embodiment of the novel gasket and back mold.

FIG. 11 discloses a variation of the fourth embodiment. Novel toric back mold 95 has a hemispherical projection 97 adapted to engage a complementally formed hemispherical recess 96 of gasket 90.

The projections formed in the toric back mold and the mating recesses formed in a gasket may be of any predetermined geometric configuration, i.e., this invention is not limited to the two exemplary mating shapes of FIGS. 10 and 11. The projections and mating recesses are annular in configuration and circumscribe the toric back mold and gasket, respectively. The projections perform the function of a carrier ring.

Moreover, they eliminate the need for the second annular flat step formed in the gasket against which the carrier ring of the first embodiment must squarely seat.

It will thus be seen that the objects set forth above, and those made apparent from the foregoing description, are efficiently attained. Since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention that, as a matter of language, might be said to fall therebetween.

Now that the invention has been described,

What is claimed is:

1. A method for making toric lenses, comprising the steps of:

providing a casting cell that includes a front mold, a toric back mold, and a gasket;

securing an annular carrier ring to said toric back mold;

dimensioning said annular carrier ring to have a diameter greater than a diameter of said toric back mold so that an annular step is formed between a peripheral edge of said toric back mold and said annular carrier ring;

providing said gasket with a radially-inwardly extending annular wall so that a first flat step is formed where a front edge of said annular wall meets said gasket at a right angle and so that a second flat step is formed where a rear edge of said annular wall meets said gasket at a right angle;

adapting said first flat step to squarely abut and support a peripheral edge of said front mold when said casting cell is assembled;

positioning said peripheral edge of said front mold in squarely abutting relation to said first flat step;

positioning said annular carrier ring in squarely abutting relation to said second flat step;

filling a cavity defined by a back surface of said front mold and a front surface of said toric back mold with a reactive resin; and curing said resin.

2. A method for making toric lenses, comprising the steps of:

providing a casting call that includes a front mold, a toric back mold, and a gasket;

integrally forming together an annular carrier ring and said toric back mold and making said annular carrier ring coextensive with a peripheral edge of said toric back mold;

forming a square, annular step in said peripheral edge of said toric back mold;

providing said gasket with a radially-inwardly extending annular wall so that a first flat step is formed where a front edge of said annular wall meets said gasket at a right angle and so that a second flat step is formed where a rear edge of said annular wall meets said gasket at a right angle;

positioning said peripheral edge of said front mold in squarely abutting relation to said first flat step;

positioning said square, annular step formed in said peripheral edge of said toric back mold in squarely abutting relation to said second flat step;

filling a cavity defined by a back surface of said front mold and a front surface of said toric back mold with a reactive resin; and curing said resin.

3. A method for making toric lenses, comprising the steps of:

providing a casting cell that includes a front mold, a toric back mold, and a gasket;

forming a radially-inwardly extending annular wall in said gasket so that a first flat step is formed where a front edge of said annular wall meets said gasket, said first flat step adapted to squarely abut and support a peripheral edge of said front mold when said casting cell is assembled;

forming an annular projection having a predetermined geometric configuration in a peripheral sidewall of said toric back mold;

forming an annular recess in said gasket for receiving said annular projection when said casting cell is assembled;

positioning said peripheral edge of said front mold in squarely abutting relation to said first flat step;

positioning said annular projection into seated relation to said annular recess;

filling a cavity defined by a back surface of said front mold and a front surface of said toric back mold with a reactive resin; and curing said resin.

4. The method of claim 1, further comprising the step of forming a radius at a juncture of said toric back mold front surface and said annular carrier ring to facilitate removal of a cast lens from the casting cell and to provide a lens having a smooth, rounded aesthetically pleasing edge.

* * * * *